United States Patent [19]

Lowe et al.

[11] 4,314,102
[45] Feb. 2, 1982

[54] POST OFFICE BOX MONITORING SYSTEM

[75] Inventors: Lynnwood Lowe, Darien; Robert B. McFiggans, Stamford, both of Conn.

[73] Assignee: Pitney Bowes Inc., Stamford, Conn.

[21] Appl. No.: 121,206

[22] Filed: Feb. 13, 1980

[51] Int. Cl.³ .................. H04M 11/10; G08B 21/00
[52] U.S. Cl. .................................... 179/2 A; 340/569
[58] Field of Search .......... 340/569; 179/2 A, 1 H, 179/16 EA

[56] References Cited

U.S. PATENT DOCUMENTS

| | | | |
|---|---|---|---|
| 2,454,088 | 11/1948 | Rapp | 340/569 |
| 2,465,935 | 3/1949 | Scalia | 340/569 |
| 2,968,804 | 1/1961 | Buffington | 340/569 |
| 3,426,326 | 2/1969 | Goldstein | 340/153 |
| 3,792,446 | 2/1974 | McFiggins et al. | 364/900 |
| 3,842,208 | 10/1974 | Paraskevakos | 179/2 A X |
| 3,935,994 | 2/1976 | Darvishian | 179/1 H X |
| 4,013,838 | 3/1977 | Tsai | 179/16 EA X |
| 4,064,367 | 12/1977 | O'Malley | 179/2 A |

*Primary Examiner*—Aristotelis M. Psitos
*Attorney, Agent, or Firm*—Mark Levy; William D. Soltow, Jr.; Albert W. Scribner

[57] ABSTRACT

A system for detecting the presence of mail in a post office box. A post office box holder calls a telephone number which accesses a computer. The computer contains data representative of the presence or absence of letters in a plurality of post office boxes. If the box to which the caller refers is occupied, a series of tone pulses is transmitted to the caller by a tone generator under the direction of the computer.

7 Claims, 5 Drawing Figures

POST OFFICE BOX MONITORING SYSTEM

FIELD OF THE INVENTION

This invention relates to automatic article detection apparatus, and more particularly to the detection of envelopes in a mail box of an apartment building, a hotel or more specifically a post office station.

BACKGROUND OF THE INVENTION

Post office boxes are rented to customers for a fee by the United States Postal Service. The boxes are individually and uniquely numbered within each post office branch that provides this service for its customers. The boxes are physically located in the post office station building. Customers usually gain access to their boxes through the lobby of the post office station building. Each box requires either a combination or a key to gain access to its contents.

While a certain number of boxes are rented to corporations and other businesses, a great number of boxes are rented to individuals. In general, such individuals receive less mail than do businesses. Whereas a post office box rented by a business is likely to be accessed by an employee every work day, this procedure may not be necessary for a box rented by an individual holder.

It is not improbable that an individual may receive no mail during a given 24 hour period. In such cases, it is often frustrating for an individual to journey to the post office station at which his box is located only to find that it is empty. Moreover, such fruitless trips are wasteful of human time, energy and gas and oil required to operate most transportation vehicles. Unnecessary congestion occurs both on the roads and in the post office station.

The problem of the detecting the presence of articles in a container, and more specifically, mail pieces in a box, is an old one. Systems, such as those hereinafter discussed, have been designed to apprize tenants in apartment buildings, lodgers in hotels, and rural mailbox users that mail has been delivered.

U.S. Pat. No. 2,968,804, for example, shows a system for indicating the presence of mail in a rural box or in a container for use in an apartment building. The system described therein uses a buzzer or a light to indicate the presence of mail to the individual in his room. This reference uses a light source and photoelectric cell to determine whether the box is empty. The system is hard wired, i.e., wires connected to the box are run directly to the individual's room. This system, while adequate for use in a rural residence or apartment, is definitely not feasible for use by individuals renting boxes from their post office station. Obviously, since some post office box holders live many miles from their post office station, it would be impractical to run wires from the box directly to their residences.

Similarly, U.S. Pat. No. 2,465,935, which teaches the use of an electric circuit for actuating a lamp and buzzer after mail has been deposited in an apartment mailbox, is a hard wired system and therefore unfeasible to satisfy the objects of the present invention.

U.S. Pat. No. 2,454,088 describes a system for remotely indicating the presence of mail at a registration desk of a hotel. Once again, however, this system requires hard wiring between the box and the indicator electric light with which it is associated. Moreover, the technique for triggering actuation of the indicator lights is a manual system which relies on the hotel clerk positioning the switch at appropriate times. Such an unautomated system is, of course, subject to error.

U.S. Pat. No. 3,426,326 teaches the use of an inventory control system for determining the quantity of items of inventory in a warehouse. A plurality of sensors is located throughout the quantity of goods to be inventoried to provide measurements indicative of the quantity of particular types of goods. This system is automated in that the computer polls lines associated with locations in the warehouse, but once again wires are run directly from the warehouse location to a central computer.

The present invention overcomes the limitations inherent in the systems described in the references cited above as they pertain to detecting the presence of an article in a container. Specifically, the present invention is intended to detect the presence of mail in a post office box from a truly remote location.

SUMMARY OF THE INVENTION

The present invention allows a user to detect the presence of articles in a container from a remote location. A computerized method of detecting the presence of objects in a plurality of containers is used, thereby eliminating the requirement of physical presence to determine whether mail has been delivered to a post office box. The convenience of customers' telephones can be used to determine whether mail has been delivered.

The present invention is embodied in apparatus comprising at least one container and sensing means for detecting the presence of an article therein. The sensing means also generates signal data responsive to the presence of an article in the container. Remote interrogating means accesses the data generated by the sensing means.

The invention finds embodiment in certain combinations of elements and arrangements of parts by which the said objects and certain other objects are hereinafter attained, all as fully described with reference to the accompanying drawings and the scope of which is more particularly pointed out and indicated in the appended claims.

DESCRIPTION OF THE PREFERRED EMBODIMENT

Figure 1:
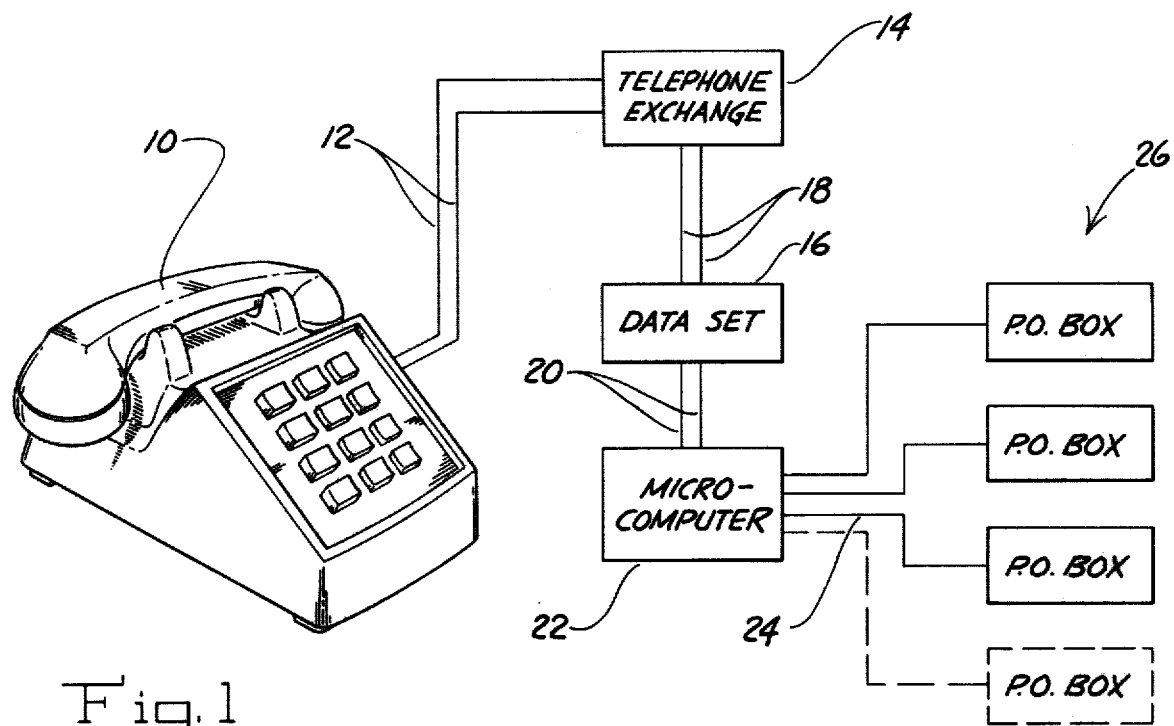
FIG. 1 is a schematic diagram for electronically performing the functions of the apparatus in accordance with this invention.

Referring now to FIG. 1, the system of the invention can be accessed by means of a post office box holder's conventional tone signaling push button telephone 10 which is connected by means of lines 12 to a telephone exchange. The use of telephone links to computerized systems is well known. U.S. Pat. No. 3,792,446 assigned to the present assignee, for example, teaches the use of a special purpose digital computer and a data set for translating frequency encoded data inputs from a telephone to a suitable machine language. The telephone exchange 14 is capable of transmitting signals to a data set 16 over suitable telephone lines 18. One suitable data set is a model number 403D, manufactured by the American Telephone and Telegraph Company. The model 403D data set is capable of generating three distinct tones in addition to providing for a voice channel. A complete description of this data set can be found in the publication, "Bell System Data Communications Technical Reference, Data Set 403D, 403E Interface Specification". In practice, most post office stations have a great number of boxes to be monitored. Systems to be used with a relatively large number of post office box holders may require multiple data sets. For purposes of illustration herein, however, a more limited system comprising only eight boxes is described notwithstanding the fact that much larger systems can be constructed in accordance with the present invention once the system as hereinafter described is understood. All such systems fall within the scope of the present invention and are intended to be incorporated thereby.

The data set 16 is connected by suitable lines shown generally at reference numeral 20 to a microcomputer 22. Suitable level converters, not shown, are interposed between the data set 16 and the microcomputer 22. The microcomputer 22 in the preferred embodiment is Model 8748, manufactured by the Intel Corporation. This microcomputer 22 has 24 ports. The microcomputer 22 contains eight input ports which are connected to lines 24 associated with eight individual post office boxes shown generally at reference numeral 26.

Figure 2:
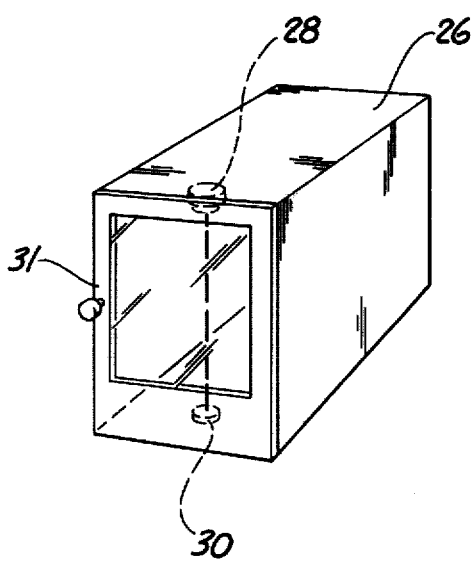
FIG. 2 shows a perspective front view of a post office box or container with article sensing means therein.

Referring now to FIG. 2, one of the post office boxes 26 is shown. A light source 28 is suitably mounted at the top of the box 28. Light from this light source 28 is directed downwardly and usually impinges on a photocell 30 which is mounted on the base of the box 26.

The light source 28 and photocell 30 are mounted close to the door 31 of the box 26 so that upon a user's request, a Postal Service employee can sort less important mail, i.e., mail usually addressed to OCCUPANT and/or sent third class. Placing mail in the box 26 in a manner so as not to interfere with the light received by the photocell 30 allows the system to indicate to the boxholder that no mail was received, thus saving the customer from a trip to the post office station merely to retrieve relatively unimportant mail.

Figure 3:
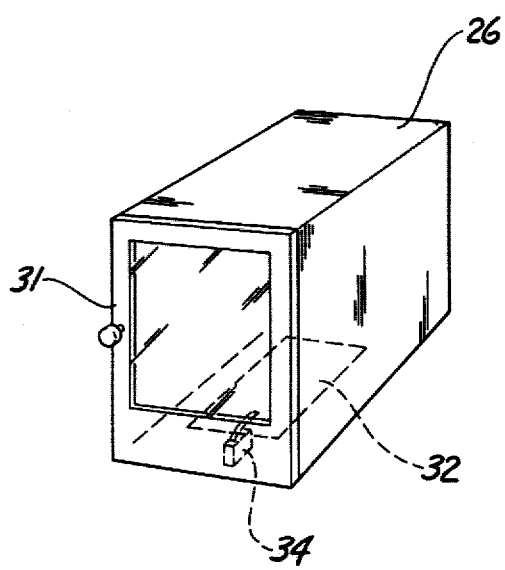
FIG. 3 shows an alternate embodiment of a post office box or container with article sensing means therein.
Figure 4:
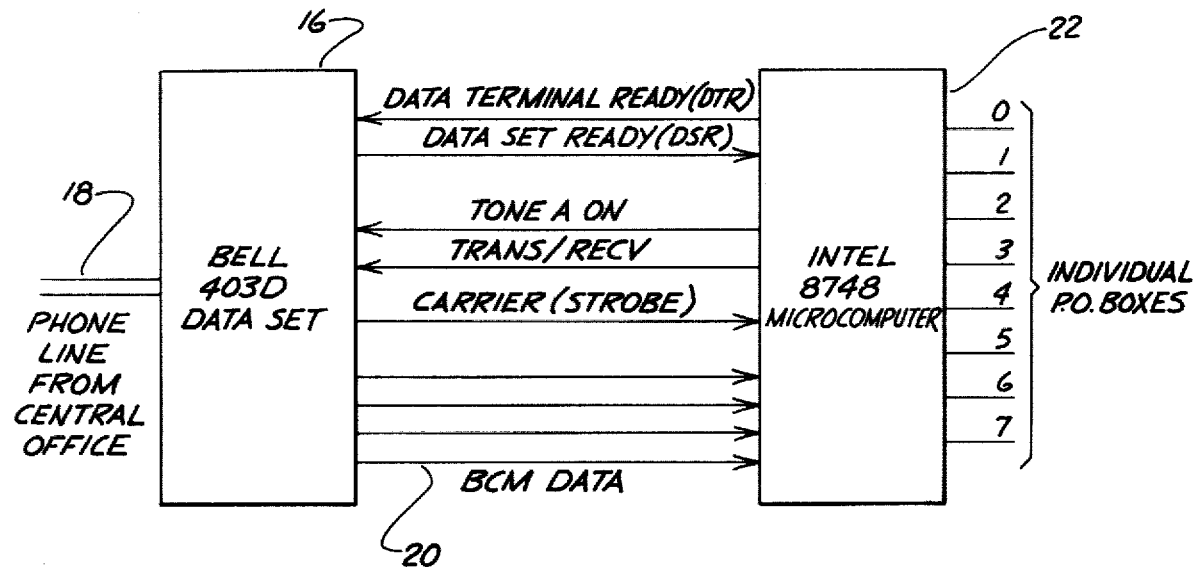
FIG. 4 is an enlarged view of a portion of the electronic schematic diagram shown in FIG. 1.

FIG. 3 shows a post office box 26 which contains an alternate embodiment of sensing means for detecting the presence of articles in the box 26. Specifically, a pressure plate 32 is disposed parallel to the base of the box 26. Beneath this pressure plate and operatively connected thereto is a micro-switch 34 capable of being actuated when an article, not shown, is placed in the box 26 and against the pressure plate 32.

Other methods of sensing the presence of an article in the box 26 can of course be contrived using other principles of physics, some of which are described in the prior art references hereinbefore discussed, but the scope of the present invention is intended to incorporate all such sensing devices.

In operation, when a letter is placed in the post office box 26 by an employee of the U.S. Postal Service, the photocell 30 senses its presence. A signal is generated over the input lines 24 to the microcomputer 22. Operation of the microcomputer 22 proceeds as hereinafter described.

Figure 5:
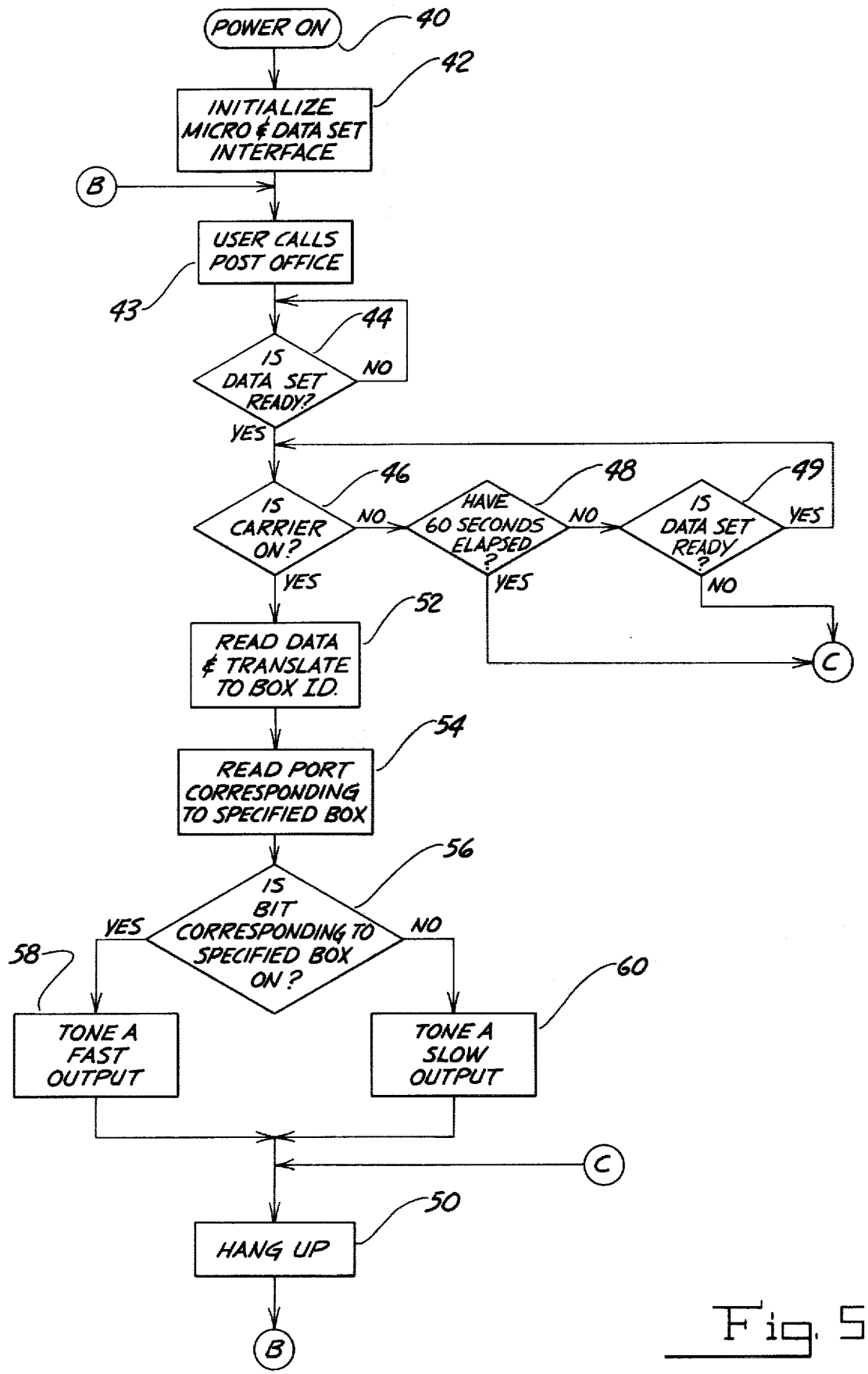
FIG. 5 is a sample flow chart for operation of the present invention.

Referring now also to FIG. 5, power is supplied to the microcomputer 22 and the data set 16, step 40. The microcomputer 22 and the data set interface 16 are initialized, step 42, by activating certain lines in preparation for system operation. At this point, for purposes of illustration assume that a boxholder uses his telephone 10 to call the number assigned to the post office for use with this system, step 43. Upon encountering the telephone call over lines 18, the data set 16 answers the incoming call.

As previously indicated, during initialization one of the lines which the microcomputer 22 activates is the DATA TERMINAL READY (DTR) line 20 between the microcomputer 22 and the data set 16. Once the data set 16 answers the call, the DATA SET READY (DSR) line 20 is normally activated, and the data set 16 relays the status of this line to the microcomputer 22 over the DSR line 20, indicating that a call is in progress. If the DSR line 20 is not active, however, the system continues to monitor its status, step 44. The data set 16, in addition to signalling the microcomputer 22 that its DSR line 20 is active, also transmits a steady tone (Tone A) of about 0.55 seconds duration to the caller over telephone lines 18. This tone indicates to the user that his transmission can begin.

If the DSR line 20 is active, step 44, the system then determines the status of the CARRIER (STROBE) line 20, step 46. The CARRIER signal is sent from the data set 16 to the microcomputer 22 in response to an input signal generated by the caller. In other words, the CARRIER line 20 is activated to indicate that the caller has pressed a telephone key and that data is present.

While the microcomputer 22 is monitoring the status of the CARRIER signal, step 46, it determines whether an appreciable amount of time, e.g., 60 seconds, has elapsed from the point at which the DSR line 20 was activated, step 48. In addition, the microcomputer 22 also determines whether the DSR line 20 is still activated, step 49. The DSR line 20 will not be activated, of course, if a call has been lost. If, while waiting for the CARRIER signal, the microcomputer 22 determines that 60 seconds have elapsed or that the phone call has been lost, the microcomputer 22 terminates the call by hanging up, step 50. In hanging up, the DTR line 20 is deactivated for 50 milliseconds or until the DSR line 20 is deactivated. Processing then continues from the point immediately after initialization of the microcomputer 22 and the data set 16, step 42. That is, the system awaits another telephone call.

In the system herein described, eight post office boxes 26 are monitored. Consequently, only one digit is required to be transmitted by the user to identify any box 26. For a system with a greater number of boxes 26, multiple digits may be required to uniquely identify a box 26. The present system can be modified to accommodate such a greater number of boxes 26 by anyone with ordinary skill in the art.

In general, for purposes of completeness there are at least three basic methods of interpreting and translating data from an incoming telephone line 18: context terminator, explicit terminator, and digit time-out. A brief explanation of each of these methods is helpful in understanding the scope of the present invention.

In the context terminator method, the system can be instructed to accept only a fixed number of digits before processing continues. For example, a three-digit format is capable of handling data for a post office station with up to 999 boxes 26. When using this system, however, leading zeroes must be used for box numbers less than 100. In the system herein described, since only eight boxes 26 are used the context terminator method is employed; the system continues processing immediately after one digit is transmitted by the user to the data set 16.

In the explicit terminator method, a certain character is sent after the last digit to indicate that the box number is complete. Terminator characters can be found on push button telephones, such as * or #.

In the digit time-out method, the system is conditioned to consider the last digit of an incoming number as the digit which is followed by at least a certain amount of time, e.g., five seconds.

Other methods of interpreting and translating data from an incoming telephone line 18 can be devised by combining the methods hereinabove described. For example, the system can be conditioned to accept as a complete number signals which are input in the following format: three digits, five seconds, or *, whichever comes first.

Once the microcomputer 22 has determined that the CARRIER line 20 is activated, step 46, four binary coded matrix (BCM) data lines, indicated generally at reference numeral 20, are decoded in the data set 16 and read, step 52. The data carried by these four data lines 20 is used to access a location in a conventional 16-element look-up table in a read only memory (ROM) in the microcomputer 22 in this embodiment. Of course, any suitable device used for permanent or temporary data storage can be used in alternative embodiments. The data which resides in this look-up table is indicative of a post office box number and/or supplementary information as hereinbelow defined.

Once a box identification number is located, step 52, the microcomputer 22 determines whether the bit corresponding to the specified box 26 is on. This determination is accomplished merely by reading the port of the microcomputer 22 corresponding to the specified box 26, step 54.

If the bit corresponding to the desired box 26 as read by the microcomputer 22 is on, step 56, then the photocell 30 in the box 26 has been tripped, indicating the presence of an article. The microcomputer 22 then directs the data set 16 by means of lines 20 to transmit Tone A over the telephone lines 18 in the form of relatively short period beeps, e.g., three tone pulses per second, step 58.

If, however, the bit corresponding to the desired box 26 is not on, step 56, then the photocell 30 in the box 26 has not been tripped, indicating that no article is present therein. The microcomputer 22 directs the data set 16 to transmit Tone A over the telephone lines 18 at a relatively long period, e.g., one tone pulse per second, step 60.

After ten seconds of Tone A tone pulse transmission, the microcomputer 22 terminates the call by hanging up, step 50. In hanging up, the DTR line 20 is deactivated for 50 milliseconds or until the DSR line 20 is deactivated. Processing then continues from the point immediately after initialization of the microcomputer 22 and the data set 16, step 42. That is, the system awaits another telephone call.

The status of certain post office boxes 26 can be protected from disclosure to callers, if desired, by programming the microcomputer 22 appropriately, such as by special access codes and the like, in a manner well known in the art. Moreover, the system disclosed in the present invention can be used to inform boxholders of certain supplementary information, as previously indicated. For example, the rental fee on a box 26 may be indicated as due, or a box 26 may be presently inactive, or a given box number sent by the user may not correspond to an existing box 26, i.e., the number is invalid. Information concerning these conditions can be added to the look-up table in the memory associated with the microcomputer 22. The microcomputer 22 can be programmed to transmit a distinctive pattern of Tone A tone pulses directly to the user over the telephone lines 18 to indicate these conditions. In more elaborate systems, voice synthesizers may be employed to convey this type of information. As previously indicated, the model 403D data set 16 includes a voice channel which may be used in conjunction with voice synthesizers to provide voice answer-back capabilities for use with one embodiment of the present invention.

The cost of implementing this system can be met by creating a surcharge to the rental fees paid by the box holders who intend to use the service.

It is understood that various modifications in structure, as well as changes in mode of operation, assembly and manner of use may and often do occur to those skilled in the art, especially after benefitting from the teachings of an invention. This disclosure illustrates the preferred means of embodying the invention in useful form.

What is claimed is:

1. Apparatus for remotely detecting the presence of articles in a container comprising:
   (a) container means;
   (b) computing means connected to said container means having a microswitch, said microswitch being actuatable by articles placed in said container means, and said computing means having a pressure plate adjacent said microswitch adapted to support said article in said container means for detecting the presence of an article and for generating data responsive to the presence of said article;
   (c) said container means being dimensioned so that said articles may be positioned within said container means in a first position which causes said microswitch to be actuated and a second position which causes said microswitch not to be actuated;
   (d) remote interrogating means connectable to said computing means for accessing said data therefrom; and
   (e) answer-back means operatively coupled to said remote interrogating means for providing audible signal information in response to actuation by said remote interrogating means.

2. Apparatus for remotely detecting the presence of articles in a container as defined in claim 1 wherein said container means includes a plurality of containers and said computing means includes computing means responsive to said remote interrogating means to selectively determine the status of a selected one of said plurality of containers.

3. Apparatus for remotely detecting the presence of an article in a container as defined in claim 1 wherein said remote interrogating means is a telephone.

4. Apparatus for remotely detecting the presence of articles in a container as defined in claim 1 wherein said answer-back means is a voice answer-back means.

5. Apparatus for detecting the presence of articles as defined in claim 4 further including telephone means coupled to said answer-back means to actuate said voice answer-back means and for receiving said audible signals from said voice answer-back means.

6. Apparatus for remotely detecting the presence of documents or parcels in receptacles, comprising:
(a) a plurality of receptacles;
(b) accounting means connected to each of said plurality of receptacles for detecting the presence of documents or parcels therein and for generating data responsive to the presence of said documents or parcels, said accounting means including computing means to selectively determine the status of a selected one of said plurality of receptacles, mechanical switch means actuatable by articles placed in each of said plurality of receptacles, and voice answer-back means to provide audible signal information;
(c) said plurality of receptacles being dimensioned so that said documents or parcels may be positioned within each of said plurality of containers in a first position which causes said switch means to be actuated and in a second position which causes said switch means not to be actuated; and
(d) remote interrogating means connectable to said accounting means for accessing said data therefrom.

7. Apparatus for remotely detecting the presence of documents or parcels in receptacles as defined in claim 6 wherein said plurality of receptacles are mail boxes.

* * * * *